(12) United States Patent
Tufano et al.

(10) Patent No.: US 10,486,335 B2
(45) Date of Patent: Nov. 26, 2019

(54) PROCESS FOR THE MANUFACTURE OF GLASS FIBRE REINFORCED PELLETS

(71) Applicant: SABIC GLOBAL TECHNOLOGIES B.V., Bergen op Zoom (NL)

(72) Inventors: Carmela Tufano, Maastricht (NL); Willy Joseph Dijsselbloem, Overpelt (BE); Stefan Gielen, Genk (BE); Gerard Jan Eduard Biemond, Brunssum (NL); Johannes Henricus Theodorus Daalmans, Kerkrade (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 154 days.

(21) Appl. No.: 15/533,531

(22) PCT Filed: Dec. 2, 2015

(86) PCT No.: PCT/EP2015/078374
§ 371 (c)(1),
(2) Date: Jun. 6, 2017

(87) PCT Pub. No.: WO2016/091686
PCT Pub. Date: Jun. 16, 2016

(65) Prior Publication Data
US 2018/0264683 A1    Sep. 20, 2018

(30) Foreign Application Priority Data

Dec. 8, 2014 (EP) .................................. 14196720

(51) Int. Cl.
*C03B 37/15* (2006.01)
*B29B 9/14* (2006.01)
(Continued)

(52) U.S. Cl.
CPC ................. *B29B 9/14* (2013.01); *B29B 9/06* (2013.01); *B29C 48/0022* (2019.02);
(Continued)

(58) Field of Classification Search
None
See application file for complete search history.

(56) References Cited

U.S. PATENT DOCUMENTS

| 4,037,011 A | 7/1977 | Hattori et al. |
| 4,083,279 A | 4/1978 | Wester et al. |

(Continued)

FOREIGN PATENT DOCUMENTS

| EP | 0900638 A2 | 3/1999 |
| EP | 1364760 A1 | 11/2003 |

(Continued)

OTHER PUBLICATIONS

Arlington Machinery, "8" Conair Jetro Pelletizer, Model 208, 15HP AC Motor", https://www.arlingtonmachinery.com/product-detail/362/8quot-conair-jetro-pelletizer-model-208-15hp-ac-motor/ (Year: 2019).*

(Continued)

*Primary Examiner* — Cynthia Szewczyk
(74) *Attorney, Agent, or Firm* — Cantor Colburn LLP

(57) ABSTRACT

The present invention relates to a process for the manufacture of a long glass fibre reinforced polypropylene composition. The process comprises: a) providing at least one continuous glass multifibre strand, b) applying a sheath of a polypropylene composition around said continuous glass multifibre strand so as to form a sheathed continuous glass multifibre strand, c) cooling the sheathed continuous glass multifibre strand to a cutting temperature, d) cutting the sheathed continuous glass multifibre strand into pellets using a rotary cutting tool at a cutting temperature that satisfies the following equations I, II and III (Continued)

$$T\_max = -0.625 \times GF + 112.5 \quad \text{(I)}$$

$$T\_min = 10 \quad \text{(II)}$$

$$T\_min \leq T\_cut \leq T\_max \quad \text{(III)}$$

wherein: T_cut is the cutting temperature, T_max is the maximum cutting temperature [° C.], T_min is the minimum cutting temperature [° C.], and GF is the amount of glass fibres based on the weight of the composition [wt. %].

17 Claims, 1 Drawing Sheet

(51) Int. Cl.
*B29B 9/06* (2006.01)
*B29C 48/04* (2019.01)
*B29C 48/05* (2019.01)
*B29C 48/00* (2019.01)
*B29K 23/00* (2006.01)

(52) U.S. Cl.
CPC .............. *B29C 48/04* (2019.02); *B29C 48/05* (2019.02); *B29K 2023/12* (2013.01)

(56) References Cited

U.S. PATENT DOCUMENTS

| | | | |
|---|---|---|---|
| 5,998,029 A * | 12/1999 | Adzima | C03C 25/26 428/392 |
| 6,202,525 B1 | 3/2001 | Hendrickson et al. | |
| 8,637,598 B2 | 1/2014 | Bernd et al. | |
| 2008/0118728 A1 | 5/2008 | Magley et al. | |
| 2009/0202829 A1 | 8/2009 | Fox et al. | |
| 2010/0189519 A1 | 7/2010 | Kerf | |
| 2015/0174808 A1 | 6/2015 | Rudolph et al. | |

FOREIGN PATENT DOCUMENTS

| | | |
|---|---|---|
| EP | 1920846 A1 | 5/2008 |
| NL | 1010646 C2 | 11/1999 |
| WO | 9900543 A1 | 1/1999 |
| WO | 2007008633 A2 | 1/2007 |
| WO | 2009080281 A1 | 7/2009 |

OTHER PUBLICATIONS

English Abstract of NL1010646(C2); Date of Publication: Nov. 19, 1999; 1 Page.

International Search Report for International Application No. PCT/EP2015/078374; International Filing Date: Dec. 2, 2015; dated Feb. 29, 2016; 5 Pages.

Machine Translation of EP1920846A1; Date of Publication: May 14, 2008; 6 Pages.

Written Opinion of the International Searching Authority for International Application No. PCT/EP2015/078374; International Filing Date: Dec. 2, 2015; dated Feb. 29, 2016; 5 Pages.

* cited by examiner a  b  C

PROCESS FOR THE MANUFACTURE OF GLASS FIBRE REINFORCED PELLETS

CROSS REFERENCE TO RELATED APPLICATIONS

This application is a 371of International Application No. PCT/EP2015/078374, filed Dec. 2, 2015, which claims priority to European Application No. 14196720.8, filed Dec. 8, 2014 which are incorporated herein by reference in their entirety.

The present invention relates to a process for the manufacture of a long glass fibre reinforced polypropylene composition containing from 10-70 wt. % of glass fibres based on the weight of the composition, the process comprising the steps of:
a) providing at least one continuous glass multifibre strand,
b) applying a sheath of a polypropylene composition around said continuous glass multifibre strand so as to form a sheathed continuous glass multifibre strand,
c) cooling the sheathed continuous glass multifibre strand to a cutting temperature.

Long glass fibre reinforced polypropylene materials are known per se and for example commercially available from SABIC Innovative Plastics under the brand name Stamax. These long glass fibre reinforced polypropylene materials are available as pellets comprising a core and a polypropylene sheath surrounding said core, wherein the core comprises glass fibres extending in a longitudinal direction of the pellet and an impregnating agent.

Methods for the manufacture of such materials are also known in the prior art.

For example, WO 2009/080281 discloses a method for the manufacture of said type of long glass fibre reinforced polypropylene materials. That method comprises the subsequent steps of:
a) unwinding from a package of at least one continuous glass multifilament strand containing at most 2% by mass of a sizing composition;
b) applying from 0.5 to 20% by mass of an impregnating agent to said at least one continuous glass multifilament strand to form an impregnated continuous multifilament strand;
c) applying a sheath of thermoplastic polymer around the impregnated continuous multifilament strand to form a sheathed continuous multifilament strand; characterised in that the impregnating agent is non-volatile, has a melting point of at least 20° C. below the melting point of the thermoplastic matrix, has a viscosity of from 2.5 to 100 cS at application temperature, and is compatible with the thermoplastic polymer to be reinforced.

According to WO 2009/080281, the sheathed continuous glass multifilament strand may be cut into pellets having a length of from 2 to 50 mm, preferably from 5 to 30 mm, more preferably from 6 to 20 mm and most preferably from 10 to 15 mm.

The term "multifilament strand" as used in WO2009/080821 and the term "multifibre strand" or "continuous multifibre strand" as used herein should be regarded as synonyms and referring to the same type of material, which, in case of glass, are often also referred to as roving or glass roving.

Another process to manufacture long glass fibre reinforced polypropylene materials is based on what is known as a pultrusion process. In such a process continuous glass multifibre strands are pulled through a molten resin in such a manner that the individual filaments are fully dispersed into said resin. Examples of such processes are disclosed in EP1364760, NL1010646 and WO 2008/089963.

An important difference between the pultrusion grade long glass fibre reinforced polypropylene materials and the long glass fibre reinforced polypropylene materials as manufactured according to the present invention is that the glass fibres in the present invention are not dispersed in the polypropylene. This dispersion will only take place once the materials are moulded into finished or semi-finished parts in downstream conversion processes, such as for example injection moulding.

U.S. Pat. No. 4,037,011 discloses a process for preparing a superior, granular, blending concentrate containing an unusually high level of reinforcing glass filaments arranged in a highly oriented disposition in a thermoplastic resin matrix comprising:
a. continuously passing a plurality of longitudinally aligned glass filaments through a zone containing a liquid pool of thermoplastic resin chosen from the group consisting of polystyrene, styrene-acrylonitrile copolymer, polyethylene, polypropylene, polycarbonate, polyamide and polyester,
b. continuously impregnating said glass filaments with the thermoplastic resin in said zone at a resin to glass ratio of between about 1 to 9 and about 3 to 7 by weight,
c. continuously withdrawing the resin impregnated glass filaments from said zone and forming same into a unitary elongate solid mass wherein said glass filaments extend in substantially parallel alignment with the longitudinal dimension of said elongate solid mass, and
d. passing the unitary continuous elongate solid mass to a cutting zone and maintaining said mass at a somewhat elevated temperature of at least 80° F. while cutting same transversely into short lengths of at least ⅛ inch so that neat free-flowing rod-shaped granules are formed without substantial longitudinal splitting.

U.S. Pat. No. 4,037,011 discloses that each glass fibers is substantially wetted by thermoplastic resin. Thus, this prior art does not disclose pellets having a core consisting of glass fibres and optionally an impregnating agent and a sheath surrounding said core and consisting of thermoplastic resin.

WO 2007/008633 discloses a process to make an electrically conductive long fiber thermoplastic concentrate wherein an electrically conductive continuous fiber strand is coated with an aqueous melt-kneaded thermoplastic dispersion, dried, and chopped. The process as disclosed in WO 2007/008633 comprises guiding an electrically conductive fiber strand or roving through a bath containing an aqueous thermoplastic dispersion. In a subsequent steps the coated roving is dried and chopped into pellets.

To allow a proper dispersion of the glass fibres in such downstream conversion processes the core of the pellets not only contains the glass fibres but also what is referred to as an impregnating agent. The impregnating agent facilitates a proper dispersion of the glass fibres during the moulding of the (semi) finished article. The impregnating agent is an important component of these long glass fibre reinforced polyolefin materials.

First of all, if the dispersion of the glass fibres in the downstream process is insufficient this will result in agglomerates of glass fibres in the end product, resulting in a poor visible appearance, so called "white spots", and possibly even loss or reduction of mechanical properties.

Secondly, if the impregnating agent does not sufficiently couple the glass fibres to each other and to the polyolefin sheath then, upon subjecting the pellets to repetitive mechanical loads, glass fibres may separate from the pellets. Such repetitive mechanical loads may occur for example during transport of the pellets through a piping system, or a vibrating conveyor means, such as a vibrating conveyor belt. Further repetitive mechanical loads occur when a number of pellets are shaken, stirred or when the pellets are filled into a suitable transport container, such as for example an octabin. In addition to that the transport container may be subject to vibrations during transport which may be another cause of glass filaments separating from the pellet. It should be understood that several variations of the above examples may also be considered as repetitive mechanical loads. The repetitive mechanical loads are usually random in nature. Of particular importance is the separation of glass fibres from the pellets during transport of the pellets through a piping system because the separated filaments may cause blocking of the piping system and/or of filters, valves, outlets and the like that are used in the piping system. Such blocking may result in down time of the equipment and possible loss of production capacity. The problem of glass fibres separating from the pellet is often referred to as the "free glass" problem.

So in effect the impregnating agent has at least two key functions, the first one being to effectively couple the glass fibres to each other and to the polyolefin sheath in the pellet and the second one being to provide a sufficient dispersion of the glass fibres in downstream conversion processes.

Examples of suitable impregnating agents are disclosed in WO 2009/080281. WO 2009/080281 specifically discloses that the impregnating agent may be a blend of 30 mass % of a hyper-branched polymer (Vybar 260, available from Baker Hughes) and 70 mass % of paraffin (Paralux oil, available from Chevron).

Strands prepared according to the pultrusion process can be cut using known cutting technologies and in general are less sensitive to the type of technology that is employed. A first reason for this is believed to be the relatively low production speed of typical pultrusion processes, which lie in the order of 30 m/min. Secondly, and according to the present inventors more importantly, the pultrusion produced strand is more or less of homogeneous composition in cross section, that is to say, the polymer forms a continuous phase throughout the cross section of the strands with the glass fibres embedded therein. As such, the fibres are more or less fixed in the polypropylene matrix so that the cut has to be made through a more or less homogeneous material.

To the contrary, the continuous glass multifilament strand according to the process of the invention is of a core-sheath structure, wherein a sheath of a polymer composition surrounds a core containing the glass fibres originating from a glass multifibre strand (or roving). In an embodiment also an impregnating agent is comprised in the core. In other words, and contrary to the pultrusion grade materials, the cross section of the sheathed glass multifibre strand, or wire-coated strand, is not of homogeneous composition in cross section. In particular, the polypropylene composition can only be found in the sheath and not in the core of the strand. As such the cutting mechanism has to be such that it allows not only a good cutting of the polypropylene, but also a good cutting of the glass multifibre strand. Finally, the wire coating process, i.e. the process according to WO2009/080821 runs at much higher speeds such as at least 300 m/min.

Accordingly the present inventors have found that the cutting of sheathed glass multifibre strands is more difficult as compared to the cutting of pultrusion based materials.

In particular the present inventors have found that if, at the position where the strand is cut, the temperature of the strand is too high then the polypropylene composition may stick to the blades causing a pollution of the cutting system and/or cause irregularly cut pellets. At the same time the present inventors found that a relatively low temperature is provides pellets with a good quality yet the obtaining of such a low temperature limits the line speed of a production line with a fixed cooling capacity, which is usually a water bath. Finally, the present inventors have found that the maximum temperature at which good quality pellets can be cut depends on the glass fibre content.

It is therefore an object of the present invention to provide a process for the manufacture of good quality pellets of a polypropylene composition sheathed glass multifibre strand.

Figure 1:
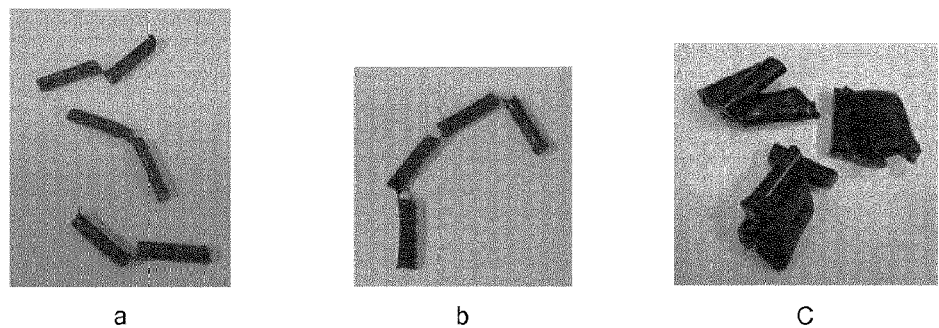
FIG. 1a shows pellets referred to as "doubles"
FIG. 1b shows pellets referred to "trains"
FIG. 1c shows pellets that stick to each other in a more random manner.

The present inventors have found that good pellets can be obtained using a rotary cutting tool and when the sheathed glass multifibre strand has a certain temperature when being cut.

To that extent the present invention is directed at a process for the manufacture of a long glass fibre reinforced polypropylene composition containing from 10-70 wt. % of glass fibres based on the weight of the composition, the process comprising the steps of:
a) providing at least one continuous glass multifibre strand,
b) applying a sheath of a polypropylene composition around said continuous glass multifibre strand so as to form a sheathed continuous glass multifibre strand,
c) cooling the sheathed continuous glass multifibre strand to a cutting temperature,
d) cutting the sheathed continuous glass multifibre strand into pellets at said cutting temperature using a rotary cutting tool wherein said cutting temperature satisfies the following equations I, II and III $$T\_max = -0.625 \times GF + 112.5 \qquad (I)$$

$$T\_min = 10 \qquad (II)$$

$$T\_min \leq T\_cut \leq T\_max \qquad (III)$$

wherein
T_cut is the cutting temperature
T_max is the maximum cutting temperature [° C.]
T_min is the minimum cutting temperature [° C.]
GF is the amount of glass fibres based on the weight of the composition [wt. %].

For the avoidance of doubt it should be understood that the term cutting temperature refers to the temperature of the sheathed continuous glass multifibre strand. This temperature can be measured either by a contact method using for example any suitable thermocouple or by means of a contact-free method, such as for example by means of infra-red temperature measurement. Since measurement of the cutting temperature at the moment the pellets are cut is difficult if not impossible in practice the cutting temperature can be measured immediately before or immediately after the sheathed strand enters or exits (as pellets) the rotary cutting tool. Given the high speed of the process of the invention there will be no or at least no significant difference with the temperature at the moment the pellet is cut.

Polypropylene Composition

The term polypropylene composition as used herein should be understood as meaning both virgin polypropylene as well as polypropylene with further materials as set forth below. The polypropylene composition may be based on a propylene homopolymer, a propylene—alpha olefin copolymer, such as a propylene—ethylene random copolymer, impact propylene copolymers, sometimes referred to as heterophasic propylene copolymers, propylene block-copolymers. Mixtures of more than one polypropylene are also possible.

The polypropylene composition may further contain additives and/or stabilisers like anti-oxidants, UV stabilisers, flame retardants, pigments, dyes, adhesion promoters like modified polypropylene, in particular maleated polypropylene, antistatic agents, mold release agents, nucleating agents and the like.

The polypropylene composition typically has a melt flow rate (MFR) that is significantly lower as compared to polypropylene compositions used in pultrusion processes. As such the MFR of the polypropylene composition may be from 10-100 g/10 min, preferably from 30-80 g/10 min as measured in accordance with ISO 1133 (2.16 kg, 230° C.). It is preferred to use a polypropylene in the polypropylene composition having a relatively low MFR, since those materials will intrinsically have improved mechanical properties over high MFR polypropylene materials.

In view of emission properties, i.e. the presence of low molecular weight materials that may be released upon exposure to high temperatures, it is preferred that the polypropylene is a non-rheology controlled or non-visbroken polypropylene. Such polypropylenes are in particular of importance for automotive interior applications.

In a particular embodiment the polypropylene composition of the sheath may contain further reinforcing additives like inorganic reinforcing agents such as talc, high aspect-ratio talc, mica, short glass fibres and glass, or organic reinforcing agents such as aramid fibres, polyester fibres, and carbon fibres. Typically sheath materials may contain up to about 30 wt. % based on the weight of sheath material of such reinforcing additive.

For the avoidance of doubt it should be understood that the term "sheath" is to be considered as a layer that tightly accommodates the core.

Glass Fibres

The long glass fibre reinforced polypropylene composition in the process according to the present invention contains from 10 to 70 wt. % of glass fibres, based on the total weight of the composition. Preferably the amount of glass fibres in the composition is from 20 to 60 wt. %, such as from 30 to 60 wt. %. Compositions having a glass fibre amount of above 50 wt. % typically being used as a concentrate for combination (i.e. dilution) with non-reinforced thermoplastics, in particular polypropylene, whereas compositions containing up to 40 wt. % of glass fibres may be used directly for the manufacture of glass fibre reinforced articles.

The glass fibres used in the present invention typically have a diameter in the range of from 5 to 50 micrometer, preferably from 10 to 30 micrometer such as from 15 to 25 micrometer. A thinner glass fibre generally leads to higher aspect ratio (length over diameter ratio) of the glass fibres in the final product prepared from the glass fibre reinforced composition, yet thinner glass fibres may be more difficult to manufacture and/or handle. In the method according to the present invention it is preferred that the glass fibres originate from glass multifibre strands, also referred to as glass rovings.

Preferably, the glass multifibre strand(s) or rovings contain from 500 to 10000 glass filaments per strand, more preferably from 2000 to 5000 glass filaments per strand. The linear density of the glass multifibre strand preferably is from 1000 to 5000 tex, corresponding to 1000 to 5000 grams per 1000 meter. Preferably the linear density is from 1000-3000 tex. Usually the glass fibres are circular in cross section meaning the thickness as defined above would mean diameter.

Rovings are generally available and well known to the skilled person. Examples of suitable rovings are the Advantex products designated for example as SE4220, SE4230 or SE4535 and available from Binani 3B Fibre Glass company, available as 1200 or 2400 tex, or TUFRov 4575, TUFRov 4588 available from PPG Fibre Glass. Most preferably rovings are used having a linear density of 3000 tex.

Pellets

The composition as manufactured with the process according to the present invention is in the form of pellets. The pellets preferably have a length of from 5 to 40 mm such as from 8 to 20 and preferably from 10 to 18 mm. The skilled person will understand that pellets preferably are substantially cylindrical with a circular cross section, yet other cross sectional shapes, like for example oval or (rounded) square also fall within the scope of the present invention.

In the pellets, the glass fibres generally extend in the longitudinal direction as a result of which they lie substantially in parallel to one another. The glass fibres extending in a longitudinal direction have a length of between 95% and 105%, more in particular between 99% and 101% of the length of a pellet. Ideally the length of the fibres is substantially the same as the length of the pellet, yet due to some misalignment, twisting, or process inaccuracies the length may vary within the aforementioned range.

In the context of the present invention FIG. 1 shows several poor quality pellets. The pellets shown in FIG. 1a are referred to as "doubles" given that two consecutively cut pellets stick to each other. The pellets shown in FIG. 1b are referred to as "trains" given that multiple consecutively cut pellets stick to each other. The pellets shown in FIG. 1c stick to each other in a more random manner. Several variations of these types of defects may exist. Another defect, referred to as "zebra", is where the sheath of the pellet is torn in a more or less longitudinal direction of the pellet so that the core containing the glass fibres is more exposed. This type of defect is in particular undesirable as the glass fibres may easily separate from the pellet.

Process

The process according to the invention is typically known as a wire-coating process. Wire-coating is carried out by passing the continuous glass multifibre strand (roving) through a wire-coating die. Said die is attached to an extruder which supplies molten polypropylene composition through an opening substantially perpendicular to the direction of the glass multifibre strand through the die. As such the thermoplastic polymer basically sheaths or encapsulates the glass multifibre strand which is the "wire" to be "coated". Such a process is also disclosed in WO 99/00543 and in WO 2009/080281, the essential difference between these disclosures being that WO 99/00543 does not require the application of impregnating agent prior to the sheathing with the thermoplastic polyolefin. In the process of the invention it is preferred that either one continuous glass multifibre strand is sheathed or two continuous glass multifibre strands are sheathed together. The latter being in particular of relevance form compositions having a relatively high amount of glass fibres, such as from 40-70 wt. % or 50-70 wt. %.

The line speed of the process may be at least 100 m/min or at least 200 m/min or at least 300 m/min or at least 400 min. Generally the line speed may be from 100-600 m/min provided the cooling capacity of the production line is sufficient for cooling the sheathed strand to the desired cutting temperature.

In a preferred embodiment the process of the invention further comprises a step of applying from 0.5 to 20 wt. % based on the weight of the composition of an impregnating agent to said at least one continuous glass multifibre strand before step b), i.e. before the application of a polypropylene composition sheath.

The presence of an impregnating agent allows a good dispersion of the glass fibres within the polypropylene composition during downstream conversion processes, such as for example injection moulding. In addition to that the impregnating agent also couples the glass fibres to each other and to the sheath to a certain extent, which has the effect that less glass fibres are separated from the sheath during the cutting process. Said in another way, the presence of an impregnating agent makes the cutting process more robust.

The present invention is not limited to a certain impregnating agent, however it is highly preferred to use an impregnating agent as defined in WO 2009/080821. That is, the impregnating agent is non-volatile, has a melting point of at least about 20° C. below the melting point of the polypropylene composition sheath and has a viscosity of from 2.5 to 100 cS at application temperature. The viscosity of the impregnating agent is lower than 100 cS, preferably lower 5 than 75 cS and more preferably lower than 25 cS at application temperature. The viscosity of the impregnating agent is higher than 2.5 cS, preferably higher than 5 cS, and more preferably higher than 7 cS at the application temperature. An impregnating agent having a viscosity higher than 100 cS is difficult to apply to the continuous strand of glass fibres. Low viscosity is needed to facilitate good wetting performance of the glass fibres, but an impregnating agent having a viscosity lower than 2.5 cS is difficult to handle, e.g., the amount to be applied is difficult to control. The melting temperature of the impregnating agent is at least about 20° C., preferably at least 25° C. or at least 30° C. below the melting point of the polypropylene composition sheath. The application temperature of the impregnating agent is selected such that the desired viscosity range is obtained. The amount of impregnating agent that is applied depends inter alia on the thermoplastic polymer used for the sheath, the amount of glass fibres, the size (diameter) of the glass fibres of the continuous strand, and on the type of sizing that is on the surface of the glass fibres. According to the present invention, the amount of impregnating agent applied to the continuous strand of glass fibres should be higher than 0.5 wt. %, preferably higher than 2 wt. %, more preferably higher than 4 wt. %, more preferably higher than 6 wt. % based on the weight of the glass fibres (including the sizing composition). The amount of impregnating agent should be lower than 20 wt. % preferably lower than 18 wt. %, more preferably lower than 15 wt. % more preferably lower than 12 wt. %. A certain minimum amount of impregnating agent is desired to assist homogeneous dispersion of glass fibres in the thermoplastic polymer matrix during moulding. An excess of impregnating agent may result in decrease of mechanical properties of the moulded articles. Suitable examples of impregnating agents for use in combination with polypropylene as the material for the sheath may comprise highly branched poly(alpha-olefins), such as polyethylene waxes, modified low molecular weight polypropylenes, mineral oils, such as, paraffin or silicon and any mixtures of these compounds. Preferably, the impregnating agent comprises a highly branched poly(alpha-olefin) and, more preferably, the impregnating agent is a highly branched polyethylene wax. The wax may optionally be mixed with a hydrocarbon oil or wax like a paraffin oil to reach the desired viscosity. WO 2009/080281 discloses as an impregnating agent a blend of 30 wt. % Vybar 260 (hyper branched polymer supplied by Baker Petrolite) and 70 wt % Paralux oil (paraffin, supplied by Chevron). The term non-volatile means that the impregnating agent does not evaporate under the application and processing conditions applied. In the context of the present invention, "substantially solvent-free" means that the impregnating agent contains less than 10% by mass of solvent, preferably less than 5% by mass solvent. Most preferably, the impregnating agent does not contain any solvent. The impregnating agent may further be mixed with other additives known in the art.

In a preferred embodiment the impregnating agent contains at least 70 wt. % of microcrystalline wax based on the weight of the impregnating agent. In that respect it is to be understood that the microcrystalline wax may be a single microcrystalline wax or a blend of several microcrystalline waxes. Microcrystalline waxes are known materials. In general a microcrystalline wax is a refined mixture of solid saturated aliphatic hydrocarbons, and produced by de-oiling certain fractions from the petroleum refining process. Microcrystalline waxes differ from refined paraffin wax in that the molecular structure is more branched and the hydrocarbon chains are longer (higher molecular weight). As a result the crystal structure of microcrystalline wax is much finer than paraffin wax, which directly impacts many of the mechanical properties of such materials. Microcrystalline waxes are tougher, more flexible and generally higher in melting point compared to paraffin wax. The fine crystalline structure also enables microcrystalline wax to bind solvents or oil and thus prevents the sweating out of compositions. Microcrystalline wax may be used to modify the crystalline properties of paraffin wax. Microcrystalline waxes are also very different from so called iso-polymers. First of all, microcrystalline waxes are petroleum based whereas iso-polymers are poly-alpha-olefins. Secondly iso-polymers have a very high degree of branching of above 95%, whereas the amount of branching for microcrystalline waxes generally lies in the range of from 40-80 wt. %. Finally, the melting point of iso-polymers generally is relatively low compared to the melting temperature of microcrystalline waxes. All in all, microcrystalline waxes form a distinct class of materials not to be confused either by paraffin or by iso-polymers. The remaining at most 30 wt % of impregnating agent may contain a natural or synthetic wax or an iso-polymer. Typical natural waxes are animal waxes such as bees wax, lanolin and tallow, vegetable waxes such as carnauba, candelilla, soy, mineral waxes such as paraffin, ceresin and montan. Typical synthetic waxes include ethylenic polymers such as polyethylene wax or polyol ether-ester waxes, chlorinated naphtalenes and Fisher Tropsch derived waxes. A typical example of an iso-polymer, or hyper-branched polymer, is Vybar 260 mentioned above. In an embodiment the remaining part of the impregnating agent contains or consists of one or more of a highly branched poly-alpha-olefin, such as a polyethylene wax, paraffin. In a preferred embodiment the impregnating agent comprises at least 80 wt %, more preferably at least 90 wt % or even at least 95 wt % or at least 99 wt % of microcrystalline wax. It is most preferred that the impregnating agent substantially consists of microcrystalline wax. In an embodiment the impregnating agent does not contain paraffin. The term substantially consists of is to be interpreted such that the impregnating agent comprises at least 99.9 wt. % of microcrystalline wax, based on the weight of the impregnating agent.

The microcrystalline wax preferably has one or more of the following properties:
- a drop melting point of from 60 to 90° C. as determined in accordance with ASTM D127
- a congealing point of from 55 to 90° C. as determined in accordance with ASTMD938
- a needle pen penetration at 25° C. of from 7 to 40 tenths of a mm as determined in accordance with ASTM D1321
- a viscosity at 100° C. of from 10 to 25 mPa·s as determined in accordance with ASTM D445
- an oil content of from 0 to 5 wt. % preferably from 0 to 2 wt % based on the weight of the microcrystalline wax as determined in accordance with ASTM D721

In an even more preferred embodiment the microcrystalline wax has all these properties in combination.

The skilled person will understand that the core of the pellet comprising the glass fibres and the impregnating agent will only be surrounded by the polyolefin sheath in the longitudinal direction. Hence, the core of the pellet is exposed to the surrounding at the two cutting planes, or cross sectional surfaces corresponding to the positions where the pellet was cut. It is for this reason that upon insufficient coupling of the glass fibres to the polyolefin sheath the glass fibres may separate from the pellet resulting in free glass as explained above.

Rotary Cutting Tool

Rotary cutting tools, or rotary cutters, are known per se and are disclosed for example in EP 1920846, US 2010/0189519, U.S. Pat. No. 6,202,525.

Generally, rotary cutters comprise a cutting wheel and a guide, which co-operate such that the sheathed glass multifibre strand can be cut into pellets.

The cutting wheel comprises a cylindrical supporting spindle supporting a number of cutting blades. These cutting blades are positioned substantially parallel to one another and further positioned at an angle of from 0° to 30°, more preferably from 0° to 15°, even more preferably from 5° to 12° relative to the axis of the supporting spindle. Hence, in a preferred embodiment the cutting blades are helically positioned on the spindle. In order to make sure that pellets with the same length are obtained the cutting blades are evenly spaced with respect to one another. An example of such configuration can be found in US 2010/0189519 which document is incorporated herein entirely by reference.

For the purpose of the present invention the detailed construction of the cutting wheel is less relevant. It is however preferred that the cutting blades are held in slots which are machined in the spindle. Such configuration allows individual cutting blades to be replaced for, for example, sharpening without having to work on the entire cutting wheel. The cutting blades can be made of any material suitable for cutting the sheathed glass multifibre strand. It is preferred that the blades are made of cemented carbide-based on tungsten carbide, high-speed steel or high strength steel, diamond, ceramics or cermet, possibly covered with mono- or multilayered titanium nitride or titanium aluminium nitride, titanium carbonitride or chromium nitride.

The cutting guide is preferably a cot wheel comprising a cylindrical roll having an even surface which is covered with a layer of an elastomeric material. It is preferred to use a polyurethane elastomer although other materials may also be suitable. Since the elastomeric cover layer of the cot wheel will act as a guide for cutting of the pellets a certain hardness of the material is required. On the one hand the material should not be too hard as otherwise the cover layer will wear too quickly, whereas on the other hand the cover layer should be hard enough to provide an effective cutting of the pellets. The optimum hardness depends on the overall system, including the type and positioning of the cutting blades as well on the material to be cut. A skilled person is able to select the most appropriate material. Cot wheels are disclosed for example in U.S. Pat. Nos. 4,083,279 and 6,202,525 albeit referred to therein as backup or cot roll.

Figure 2:
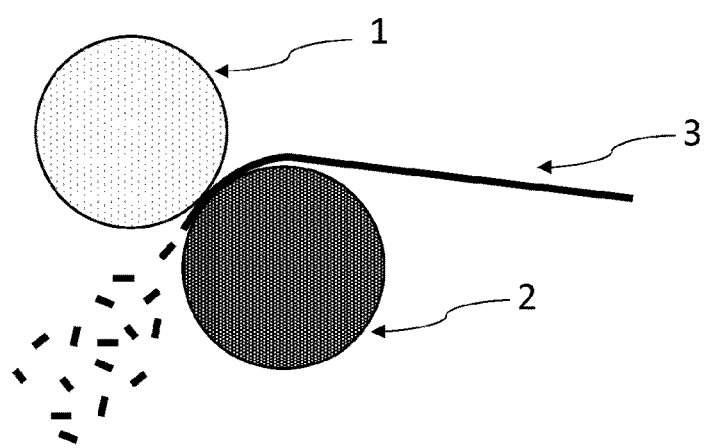
FIG. 2 schematically shows the cutting process of a continuous glass multifibre strand.

In use the cutting wheel and cot wheel work such that the continuous glass multifibre strand is cut into pellets. This is illustrated in FIG. 2. FIG. 2 schematically shows schematically the cutting process of a continuous glass multifibre strand 3. The strand is pulled into the rotary cutter by cutting wheel 1 and cot wheel 2. Cutting wheel 1 contains a cylindrical spindle and a number of cutting blades (not shown) evenly spaced in a substantially parallel manner and helically positioned on the spindle. The distance between the evenly spaced cutting blades determines the length of the pellet to be cut.

The cutting wheel and the cot wheel co-operate such that not only the pellets are cut but that also the strand is pulled into the rotary cutter. Although the present invention is not limited to this configuration it brings the added advantage that no further means for transporting the continuous glass multifibre strand to the rotary cutter is needed.

Accordingly in a preferred embodiment the process of the invention comprises cutting of the sheathed continuous glass multifibre strand using a rotary cutting tool comprising a cutting wheel and a cutting guide, wherein
- the cutting wheel comprises a cylindrical supporting spindle supporting a number of cutting blades positioned substantially parallel and evenly spaced relative to one another and further positioned at an angle of from 0° to 30° relative to the axis of the supporting spindle,
- the cutting guide is a cot wheel comprising a cylindrical roll having an even surface covered with a layer of an elastomeric material, and wherein, in use, the rotary cutting wheel and the cutting guide co-operate such that the continuous glass multifibre strand is cut into pellets.

Application

The glass fibre reinforced polypropylene composition manufactured with the process according to the invention may be used for the manufacture of articles or structural parts by known down-stream processing techniques. Such techniques include injection moulding, extrusion moulding, compression moulding and the like.

Typical applications of the composition of the present invention are structural parts requiring a high stiffness.

For example the composition of the present invention can be used for the manufacture of automotive parts, like bumpers, instrument panel carriers, door modules, tailgates, front-end modules, gas pedal boxes, airbag housing, air conduits, sun-roof structures, batter-boxes and the like.

Alternatively the composition of the present invention can be used for the manufacture of rods, sheets, pipes or pipes forming the basic building blocks for any structural application either as automotive or non-automotive.

In addition the composition of the present invention may be used for the manufacture of domestic appliances like washing machines, wash dryers, electrical appliances like coffeemakers, toasters, refrigerators, vacuum cleaners and the like.

The present invention will now be explained on the basis by the following examples, which in no way should be considered as limiting the present invention.

EXAMPLE 1

A glass fibre reinforced polypropylene composition, containing 60 wt. % of glass fibres was manufactured with a wire coating process as generally disclosed in WO 2009/080281.

The polyolefin sheath material was SABIC PP579S polypropylene, available from SABIC and having a melt flow as determined according to ISO 1133 (2.16 kg, 230° C.) of 47 g/10 min.

The process was started such that pellets were cut at a cutting temperature of about 55° C.

Next, the temperature of the strand at which the strand is cut (cutting temperature) was gradually raised and the quality of the pellets was observed visually. The raising of the temperature was done by reducing either one or both of the residence time in the water cooling bath and the line speed.

The cutting temperature of the pellets was determined by measuring the temperature of a number of pellets collected in a collecting vessel positioned immediately after the rotary cutter. The measurement was carried out by placing a thermocouple between the pellets in the collecting vessel and by reading the temperature. The present inventors found that that, since the collecting vessel is positioned immediately after the rotary cutter, the so measured temperature is very close if not identical to the temperature of the pellet when it is actually being cut.

It was found that at a temperature above 75° C. the pellet quality started to deteriorate and some pellets were observed where the sheath was (partially) torn in a length direction of the pellet. Such pellets are undesirable as they may result in the glass fibres separating from the pellets. This problem is more pronounced for pellets containing a high amount of glass fibres.

Next the temperature of the strand that which the strand is cut (cutting temperature) was gradually decreased and the quality of the pellets was observed visually. No change in pellet quality was observed.

EXAMPLE 2

A glass fibre reinforced polypropylene composition, containing 20 wt. % of glass fibres was manufactured with a wire coating process identical to the process of Example 1.

The process was started such that pellets were cut at a cutting temperature of about 85° C. Next, the temperature of the strand at which the strand is cut (cutting temperature) was gradually raised and the quality of the pellets was observed visually.

The cutting temperature was determined in the same manner as in Example 1.

It was found that at a temperature of around 100° C. the pellet quality started to deteriorate and some pellets were observed which would stick together in pairs (referred to as "doubles") or where multiple pellets would stick together (referred to as "trains") or where several pellets would stick together in random manner.

Next the temperature of the strand that which the strand is cut (cutting temperature) was gradually decreased and the quality of the pellets was observed visually. No change in pellet quality was observed.

Based on Examples 1 and 2 the present inventors came to the conclusion that the maximum cutting temperature when using a rotary cutter is determined not only by the temperature at which the pellets are cut but also by the amount of glass fibres.

The invention claimed is:

1. Process for the manufacture of a long glass fibre reinforced polypropylene composition containing from 10-70 wt. % of glass fibres based on the weight of the composition, the process comprising:
   a) providing a continuous glass multifibre strand,
   b) applying a sheath of a polypropylene composition around said continuous glass multifibre strand so as to form a sheathed continuous glass multifibre strand,
   c) cooling the sheathed continuous glass multifibre strand to a cutting temperature,
   d) cutting the sheathed continuous glass multifibre strand into pellets at said cutting temperature using a rotary cutting tool wherein said cutting temperature satisfies the following equations I, II and III $$T\_max = -0.625 \times GF + 112.5 \qquad \text{I)}$$

$$T\_min = 10 \qquad \text{II)}$$

$$T\_min \leq T\_cut \leq T\_max \qquad \text{III)}$$

wherein
T_cut is the cutting temperature
T_max is the maximum cutting temperature [° C.]
T_min is the minimum cutting temperature [° C.]
GF is the amount of glass fibres based on the weight of the composition [wt. %].

2. The process of claim 1 further comprising a step of applying from 0.5 to 20 wt. % based on the weight of the composition of an impregnating agent to said continuous glass multifibre strand before step b).

3. The process of claim 1, wherein the polypropylene composition has a melt flow rate of from 10-100 g/10 min as measured in accordance with ISO 1133 (2.16 kg, 230° C.).

4. The process of claim 3, wherein the melt flow rate is from 30-80 g/10 min as measured in accordance with ISO 1133 (2.16 kg, 230° C.).

5. The process of claim 1, wherein the glass multifibre strand has a linear density of from 1000 to 5000 tex.

6. The process of claim 5, wherein the linear density is from 1000 to 3000 tex.

7. The process of claim 1, wherein one glass multifibre strand is sheathed or two glass multifibre strands are sheathed together.

8. The process of claim 1, wherein the diameter of the glass fibres in the glass multifibre strand is from 5 to 50 micrometer.

9. The process of claim 1, wherein the process is operated at a line speed is at least 100 m/min.

10. The process of claim 1, wherein in step d) the pellets are cut to a length of from 5 to 40 mm.

11. The process of claim 10 wherein in the pellets the glass fibres extend in a longitudinal direction of the pellet and have a length of between 95% and 105% of the length of a pellet.

12. The process of claim 1, wherein the rotary cutting tool comprises
- a rotary cutting wheel comprising a cylindrical supporting spindle and several cutting blades positioned on the outer surface of the spindle, and
- a cutting guide,
- wherein, in use, the rotary cutting wheel and the cutting guide co-operate such that the sheathed continuous glass multifibre strand is cut into pellets.

13. The process of claim 1, wherein the long glass fibre reinforced polypropylene composition contains from 20-60 wt. % of glass fibres based on the weight of the composition.

14. Process for the manufacture of a long glass fibre reinforced polypropylene composition containing from 10-70 wt. % of glass fibres based on the weight of the composition, the process comprising:
a) providing a continuous glass multifibre strand having a linear density of from 1000 to 5000 tex, and wherein the diameter of the glass fibres in the glass multifibre strand is from 10 to 30 micrometer,
b) applying from 0.5 to 20 wt. % based on the weight of the composition of an impregnating agent to said continuous glass multifibre strand
c) applying a sheath of a polypropylene composition around said continuous glass multifibre strand so as to form a sheathed continuous glass multifibre strand,
d) cooling the sheathed continuous glass multifibre strand to a cutting temperature,
e) cutting the sheathed continuous glass multifibre strand into pellets at said cutting temperature using a rotary cutting tool, wherein in the pellets the glass fibres extend in a longitudinal direction of the pellet and have a length of between 95% and 105% of the length of a pellet,
wherein said cutting temperature satisfies the following equations I, II and III $$T\_max = -0.625 \times GF + 112.5 \qquad \text{I)}$$

$$T\_min = 10 \qquad \text{II)}$$

$$T\_min \leq T\_cut \leq T\_max \qquad \text{III)}$$

wherein
T_cut is the cutting temperature,
T_max is the maximum cutting temperature [° C.],
T_min is the minimum cutting temperature [° C.]
GF is the amount of glass fibres based on the weight of the composition [wt. %].

15. The process of claim 14, wherein the diameter of the glass fibres in the glass multifibre strand is 15 to 25 micrometer.

16. The process of claim 14, wherein the process is operated at a line speed of 100-600 m/min.

17. The process of claim 14, wherein the pellets have a length of 8 to 20 mm.

* * * * *